United States Patent
Simonds

(10) Patent No.: US 6,740,146 B2
(45) Date of Patent: May 25, 2004

(54) OXYGEN CONCENTRATOR

(76) Inventor: Edward L. Simonds, 459 Myers S., Salem, OR (US) 97302

(*) Notice: Subject to any disclaimer, the term of this patent is extended or adjusted under 35 U.S.C. 154(b) by 0 days.

(21) Appl. No.: 10/243,135

(22) Filed: Sep. 12, 2002

(65) Prior Publication Data

US 2004/0050255 A1 Mar. 18, 2004

(51) Int. Cl.$^7$ ............................................. B01D 53/053
(52) U.S. Cl. ........................... 96/130; 95/130; 96/111; 96/133; 96/143
(58) Field of Search ..................... 95/130; 96/111, 96/113, 114, 121, 130, 133, 143, 144

(56) References Cited

U.S. PATENT DOCUMENTS

| | | | | |
|---|---|---|---|---|
| 2,884,844 A | * | 5/1959 | Sellers | 454/70 |
| 3,164,454 A | * | 1/1965 | Wilson | 95/130 |
| 3,236,028 A | * | 2/1966 | Rutan | 95/98 |
| 4,169,715 A | * | 10/1979 | Eriksson | 96/114 |
| 4,207,084 A | * | 6/1980 | Gardner | 96/113 |
| 4,354,859 A | * | 10/1982 | Keller et al. | 95/96 |
| 4,576,616 A | * | 3/1986 | Mottram et al. | 95/96 |
| 4,636,226 A | * | 1/1987 | Canfora | 95/138 |
| 4,681,099 A | * | 7/1987 | Sato et al. | 128/204.23 |
| 4,698,075 A | * | 10/1987 | Dechene | 96/116 |
| 4,801,308 A | * | 1/1989 | Keefer | 95/96 |
| 4,948,401 A | * | 8/1990 | Izumi et al. | 96/115 |
| 4,968,329 A | * | 11/1990 | Keefer | 95/98 |
| 5,082,473 A | * | 1/1992 | Keefer | 95/98 |
| 5,096,469 A | * | 3/1992 | Keefer | 95/92 |
| 5,256,172 A | * | 10/1993 | Keefer | 423/230 |
| 5,354,361 A | * | 10/1994 | Coffield | 95/103 |
| 5,531,807 A | * | 7/1996 | McCombs | 95/26 |
| 5,968,236 A | * | 10/1999 | Bassine | 96/130 |
| 6,156,100 A | * | 12/2000 | Conrad et al. | 95/98 |
| 6,162,283 A | * | 12/2000 | Conrad et al. | 95/98 |
| 6,176,897 B1 | * | 1/2001 | Keefer | 95/98 |
| 6,217,635 B1 | * | 4/2001 | Conrad et al. | 95/97 |
| 6,290,759 B1 | * | 9/2001 | Fenner et al. | 96/130 |
| 6,348,082 B1 | * | 2/2002 | Murdoch et al. | 95/22 |
| 6,395,065 B1 | * | 5/2002 | Murdoch et al. | 95/22 |
| 6,478,850 B1 | * | 11/2002 | Warren | 95/21 |
| 6,511,525 B2 | * | 1/2003 | Spletzer et al. | 95/41 |
| 6,511,526 B2 | * | 1/2003 | Jagger et al. | 95/96 |

* cited by examiner

Primary Examiner—Robert H. Spitzer
(74) Attorney, Agent, or Firm—Olson & Olson

(57) ABSTRACT

This invention includes a pair of chambers each containing a piston which is reciprocated slowly by a computer controlled reversible fluid pressure pump between an advanced position for moving room air through a molecular sieve bed to strip nitrogen from the air and deliver oxygen enriched air to a patient, and a retracted position to back-flush the sieve bed with oxygen enriched air and exhaust the nitrogen rich air to the atmosphere. The pistons may be moved by piston rods or by a rack and pinion drive. In a third embodiment a single cylinder forms a pair of chambers separated by a central exhaust chamber, and expandable bellows in the chambers extend and retract either alternatively or simultaneously. In a fourth embodiment a single cylinder containing a single piston forms a pair of chambers one on each side of the piston and a molecular sieve bed communicates with each chamber.

26 Claims, 7 Drawing Sheets

OXYGEN CONCENTRATOR

BACKGROUND OF THE INVENTION

This invention relates to oxygen concentrators, and more particularly to a novel oxygen concentrator construction characterized by the absence of noisy, high speed air compressors and consequent vibration, friction heat and component wear, providing extremely long operating performance with low power and minimum maintenance.

Oxygen concentrators of the prior art are comparatively large, heavy and employ relatively high speed air compressors to move room air rapidly through a molecular sieve bed to strip nitrogen from the air and deliver oxygen rich air to a patient. Air compressors are noisy, they generate friction heat and cause vibration of the equipment, with consequent wear and necessary repair, replacement and maintenance of components.

SUMMARY OF THE INVENTION

The oxygen concentrator of this invention utilizes a pair of chambers each containing a piston which is reciprocated slowly by a computer controlled reversible fluid pressure pump between an advanced position for moving room air through a molecular sieve bed to strip nitrogen from the air and deliver oxygen enriched air to a patient and a retracted position to back-flush the sieve bed with air and exhaust the nitrogen rich air to the atmosphere.

It is the principal objective of this invention to provide an oxygen concentrator of the class described which is devoid of air compressors and associated disadvantages of friction heat, noise, vibration and excessive cost of maintenance and repair.

Another objective of this invention is the provision of an oxygen concentrator of the class described in which the pistons are reciprocated very slowly to effect maximum oxygen concentration efficiency at minimum cost of operation.

A further objective of this invention is to provide an oxygen concentrator of the class described in which the retraction movement of the pistons effect back-flushing of the sieve beds to exhaust the nitrogen rich air to the atmosphere.

Still another objective of this invention is the provision of an oxygen concentrator of the class described in which the pistons are reciprocated slowly by a small fluid pressure pump.

A further objective of this invention is the provision of an oxygen concentrator of the class described in which the pistons are reciprocated by fluid pressure acting on sealed piston rods associated with the pistons.

A still further objective of this invention is the provision of an oxygen concentrator of the class described in which the pistons are reciprocated by fluid pressure acting on an expandable bellows.

A still further objective of this invention is to provide an oxygen concentrator of the class described in which the pistons are reciprocated by a rack and pinion interconnection.

Another objective of this invention is to provide an oxygen concentrator of the class described in which the cycling of the pistons may be varied by computer to adjust the oxygen concentration delivery to patient.

Still another objective of this invention is the provision of an oxygen concentrator of the class described in which room air is delivered to the cylinders by operation of a small, quiet, low voltage air fan.

A further objective of this invention is to provide an oxygen concentrator of the class described in which room air is delivered to the cylinders by reciprocation of the pistons.

Another objective of this invention is the provision of an oxygen concentrator which is operable with minimum DC voltage from a battery or an AC converter supply, for home, automobile or portable use.

A still further objective of this invention is to provide an oxygen concentrator of the class described which is of simplified, lightweight and compact construction for economical manufacture, maintenance and repair.

The foregoing and other objects and advantages of this invention will appear from the following detailed description, taken in connection with the accompanying drawings of preferred embodiments.

DESCRIPTION OF THE PREFERRED EMBODIMENTS

Figure 1:
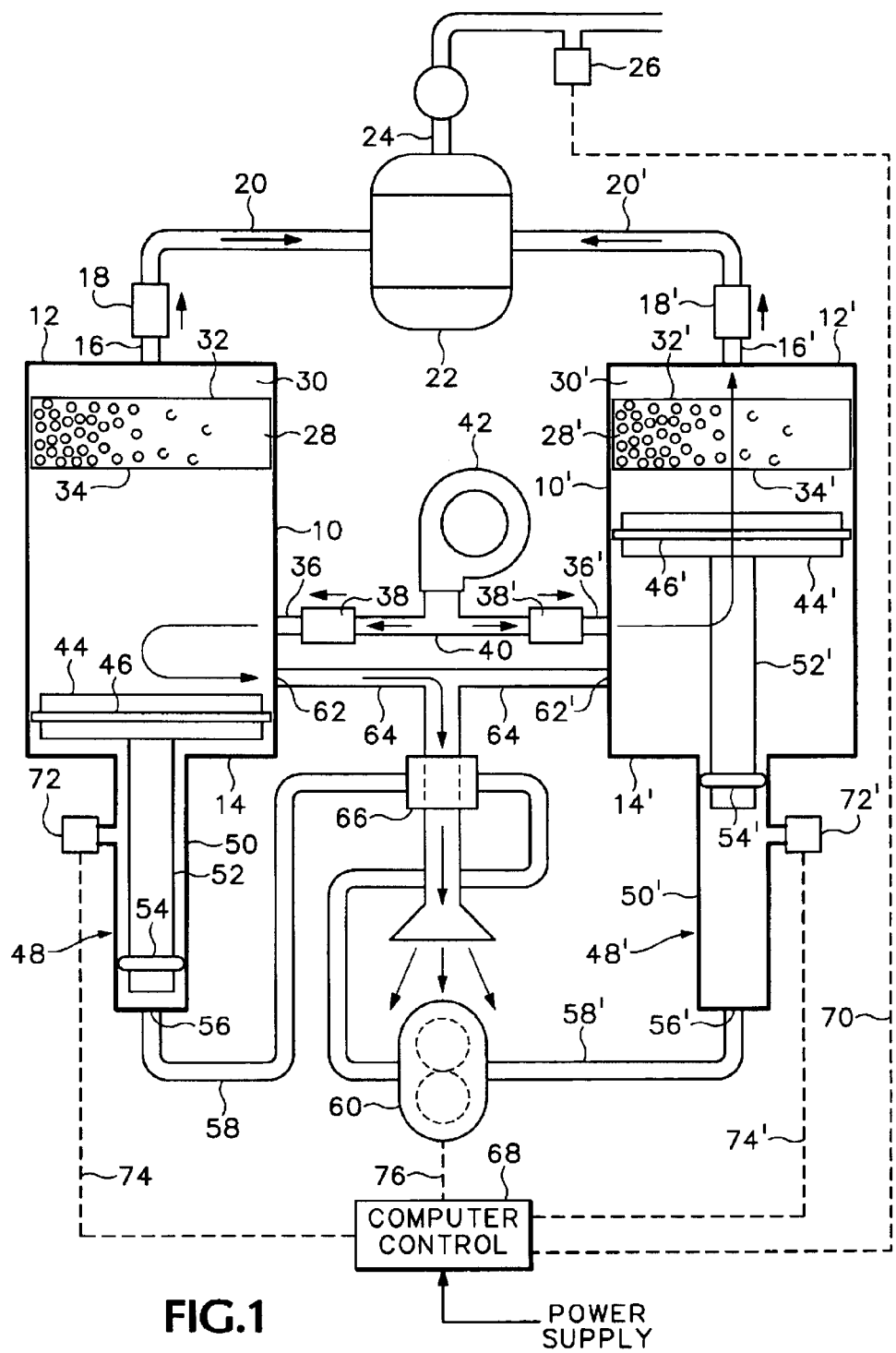
FIG. 1 is a schematic diagram of an oxygen concentrator apparatus embodying features of this invention and shown in a starting condition of one cycle in the operation of the apparatus.
Figure 2:
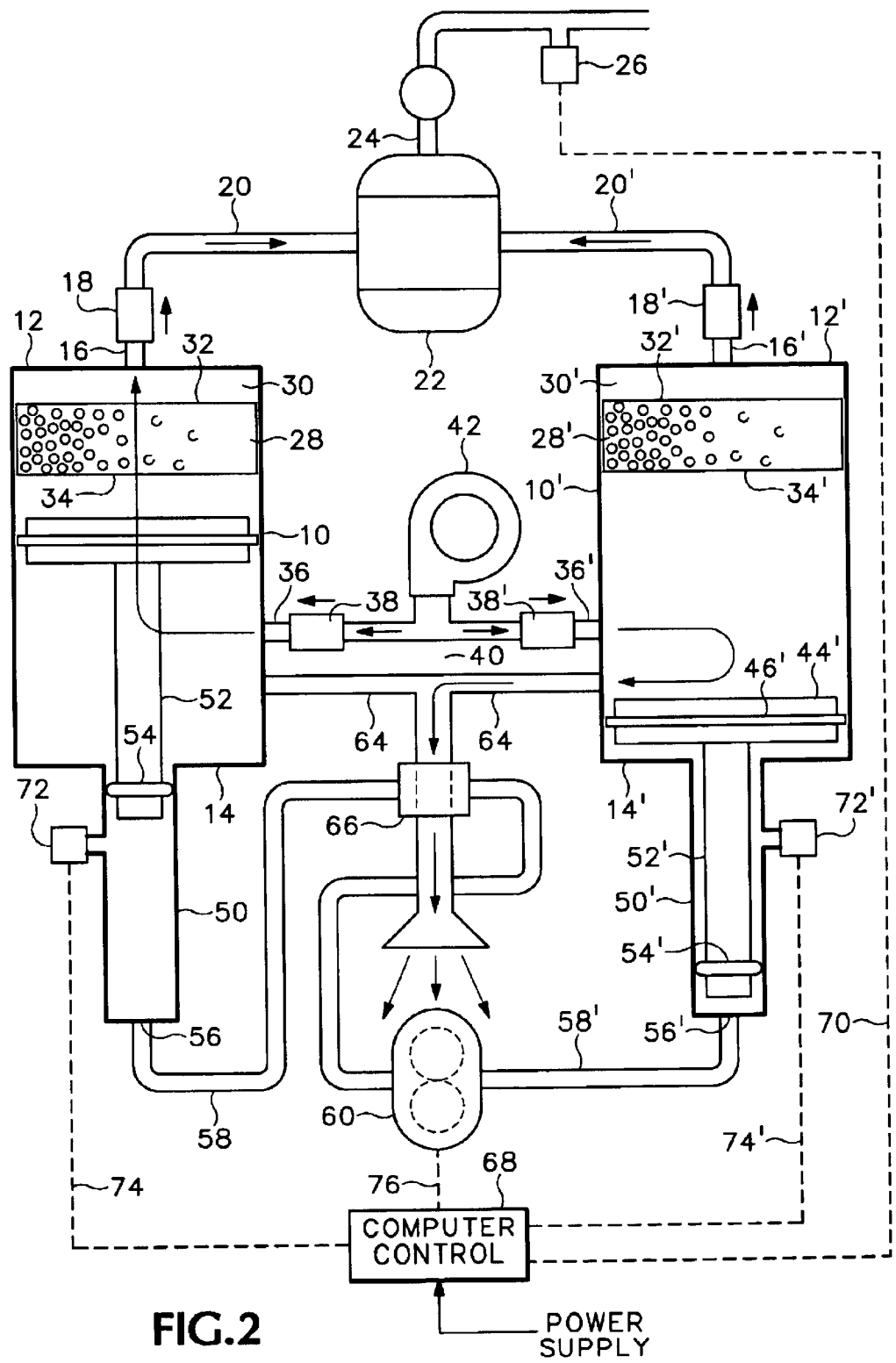
FIG. 2 is a schematic diagram of the apparatus of FIG. 1 but showing the apparatus in a mid-point condition of the cycle of operation.
Figure 3:
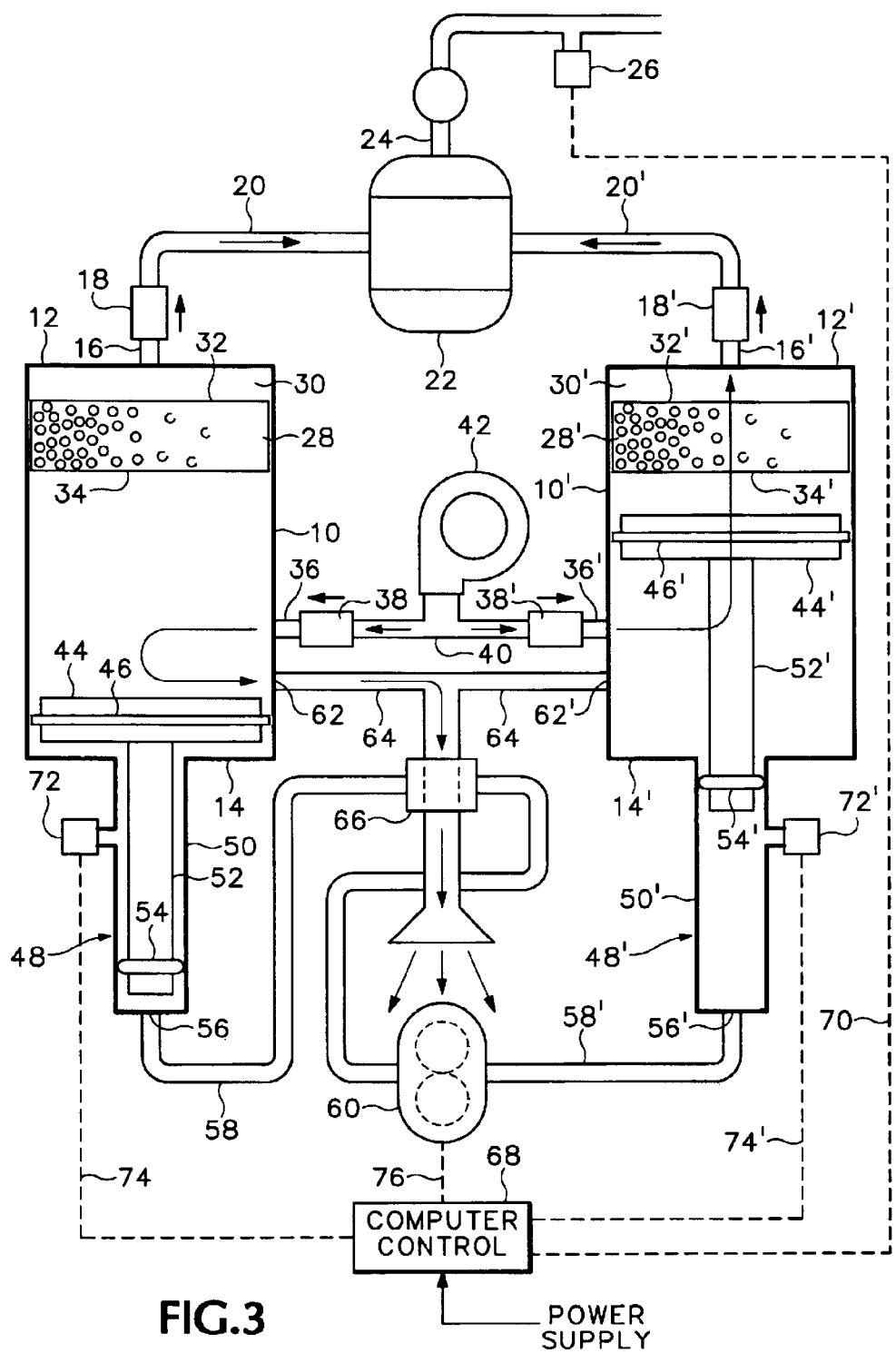
FIG. 3 is a schematic diagram substantially identical to FIG. 1 showing the apparatus in the final state of its cycle and in the starting condition of the next and subsequent cyclings in the operation of the apparatus.

In the embodiments illustrated in FIGS. 1–3, the oxygen concentrator of this invention includes two opposite, identical cylinder members 10, 10' each having a first longitudinal end 12, 12' and an opposite second longitudinal end 14, 14' defining therebetween an enclosed, hollow chamber having a predetermined volume. The first end 12, 12' may if desired be provided in the form of a removable end cap member configured to provide a releasable but sealing closure of the cylinders while also permitting access thereinto as may be needed for maintenance, etc.

As illustrated, the first ends 12, 12' each includes an oxygen rich air outlet port 16, 16' which communicates through a one-way check valve 18, 18' and conduit 20, 20' with the inlet of an oxygen enriched air accumulator vessel 22. The outlet 24 of the accumulator vessel is directed in conventional manner to a patient through an oxygen sensor and flow sensor 26 discussed hereinafter.

Referring again to cylinders 10, 10', each mounts within its interior a molecular sieve bed 28, 28' positioned therein to form an empty, fixed volume space 30, 30' between the outlet ends 32, 32' of the sieve beds and the respective one-way check valve 18, 18', for reasons explained hereinafter. The material composition of the sieve beds, for example zeolite, is well known in the oxygen concentrator art and therefore need not be discussed in detail herein except to point out that its function is to strip nitrogen from air being passed through the sieve bed, with oxygen-rich air passing out of the outlet end of the sieve bed.

As is well known, oxygen concentrators must include means for periodically reversing the flow of air through the molecular sieve bed to purge the sieve bed of the accumulated nitrogen collected during the aforementioned stripping process.

Each cylinder 10, 10' is provided with an inlet port 36, 36' arranged to provide for the introduction of room air into the cylinder chambers beneath the inlet ends 34, 34' of the sieve beds. These air inlet ports communicate through one-way check valves 38, 38' with a conduit 40 which is connected to the output of a small electric blower fan 42 arranged to run continuously during the operation of the oxygen concentrator apparatus.

As illustrated, each cylinder 10, 10' is provided with a reciprocal piston member 44, 44' having a seal member 46' 46' (illustrated herein as typical piston rings) arranged for sliding, substantially sealing engagement with the inner wall surface of the cylinders during reciprocation of the pistons. Drive means engages each of the pistons for continuously reciprocating the pistons within their respective cylinders such that when one piston reaches the bottom of its stroke within its cylinder, the other piston reaches the top of its stroke within its corresponding cylinder, and vice versa in continuing, alternate reciprocal cycles as illustrated in FIGS. 1, 2 and 3.

In the embodiment of FIGS. 1–3, the piston drive means comprises a fluid pressure system, either pneumatic or, preferably, hydraulic. As shown, the second, bottom end 14, 14' of each cylinder 10, 10' includes a drive cylinder extension unit 48, 48' having a fixed outer cylinder member 50, 50' and an inner, telescopically movable piston rod member 52, 52' connected to the associated piston members 44, 44'. Fluid seal rings 54, 54' are provided on the telescoping piston rod members 52, 52' to assure sealing interengagement between the inner piston rod members and the outer fluid pressure drive cylinders when acted upon by a pressurized fluid introduced behind the piston-forming seal rings 54, 54', as is well known in the construction of telescoping hydraulic and pneumatic piston-cylinder units. Each drive cylinder unit 48, 48' includes a fluid port 56, 56' for passage of fluid into and out of the associated drive cylinder behind the seat rings 54, 54', the fluid ports being connected by fluid lines 58, 58' to the outlets of a small, reversible flow fluid pressure pump 60.

As will be apparent, the fluid system contains sufficient fluid to completely fill the lines 58, 58', pump 60, one telescopic cylinder 48, 48' in a fully extended condition of its piston rod member and the other telescopic cylinder 48, 48' in a fully retracted condition of its piston rod member. In this manner, operation of the pump 60 in one direction moves fluid from the extended cylinder to the retracted cylinder, thereby retracting one cylinder and extending the second cylinder, as illustrated in FIGS. 1 and 2 of the drawings. Reverse operation of the pump 60 of course then moves fluid from the second, now extended cylinder back to the first cylinder, thereby retracting the second piston rod member and again extending the first, as illustrated by the movements in FIGS. 2 and 3 of the drawings. Clearly, continued operation of the pump in this manner effects continued reciprocal movement of the pistons 44, 44' within their respective cylinders 10, 10'.

As previously mentioned, room air is continuously introduced into the cylinders 10, 10' through inlet ports 36, 36' connected to the small blower fan 42. Air exhaust ports 62, 62' are provided at a predetermined point above the piston seal members 46, 46' when the pistons are disposed in their fully retracted condition within the cylinders 10, 10' in order to communicate the interior of each cylinder with the outside atmosphere. This allows air introduced into the cylinders at inlets 36, 36' to circulate therethrough and exhaust from the cylinder while the piston is disposed in a lower portion of its stroke below the exhaust ports 62, 62'. The flow rate of air from the blower fan assures full circulation of fresh room air throughout the interior of the cylinders 10, 10' and thence out of the exhaust ports 62, 62' where the air in the cylinders is completely changed during the portion of each reciprocal cycle when the pistons are disposed below the associated exhaust ports.

In the embodiment of FIGS. 1–3, the exhaust air may further be utilized to provide for cooling of the hydraulic fluid and pump 60 during operation of the system. In this arrangement, exhaust ports 62, 62' are connected to a conduit 64 configured to communicate the exhaust air through a fluid cooling radiator 66 and thence over the fluid pump as indicated by the arrows in the drawings. This arrangement thus makes extremely efficient and complete use of room air moved by fan 42 in the overall operation of the oxygen concentrator of this invention.

As shown in the drawings, the oxygen concentrator apparatus of this invention includes means for controlling the operation of the apparatus, which control means may be a computer control unit 68. In the illustrated embodiment, oxygen flow sensor 26 is arranged to send electric signals 70 to the computer 68 indicating the rate that oxygen is being delivered to a patient. Fluid pressure sensors 72, 72' or other suitable limit sensing or switch means is associated with the drive cylinders 48, 48' and send electric signals 74, 74' to the computer 68 indicating that a piston rod member 48, 48' has reached a predetermined limit in its stroke, whereby the computer functions to reverse the fluid flow, as for example by reversing the operative direction of the pump 60 and thereby effect continuous reciprocation of the pistons 44, 44' as described earlier.

Finally, the computer is electrically connected 76 to the pump 60 whereby the computer variably controls both the speed of operation of the pump as well as the aforementioned control of the forward and reversing of directions of fluid flow between the drive cylinders 48, 48'. In this manner the computer sets the speed of the pump operation to provide a preset rate of oxygen flow to a patient as detected by sensor 26 actually reading the output of oxygen flow to the patient.

Alternatively, of course, oxygen flow sensor 26 may comprise other known sensors that detect variations in the patient's need for oxygen and signal the computer 68 accordingly. For example, when a patient's demand for oxygen is comparatively low, as during sleep, such a sensor will signal the computer of that situation and adjust the pump to run at a lower speed sufficient to provide the lower rate of oxygen flow needed. When the patient becomes active and the magnitude of breathing increases, the sensor will signal the computer of the increased demand which in turn then increases the pump speed in order to satisfy the necessary increase of oxygen flow rate needed by the more active patient.

With it being recognized that FIGS. 1–3 illustrate the beginning point, mid point and end point of one complete reciprocal cycle of the apparatus of this invention, the operation of the concentrator is as follows: With piston 44 at the bottommost point in its stroke and piston 44' at the topmost point in its stroke (FIG. 1), fresh room air from small fan 42 enters cylinder 10 through inlet port 36 and circulates through the interior of the cylinder and out exhaust port 62. Sensor 72' signals computer 68 that the piston rod 52' in fluid drive cylinder 48 is fully extended and piston 44' is at its uppermost stroke, whereupon the computer reverses the fluid pump 60 to draw fluid from line 58' and fluid drive cylinder 48' and pump it into line 58 and fluid drive cylinder 48, causing the piston rod 52' in drive cylinder 48' to retract and the piston rod 52 in drive cylinder 48 to extend toward the molecular sieve bed 28, effectively moving the fresh air contained in the cylinder 10 above the piston seal 46 through the molecular sieve bed 28, the oxygen enriched air passing from the outlet end of 32 of the sieve bed and through the one-way check valve 18 into the accumulator vessel 22 and ultimately out to the patient.

As will be understood, as the piston 44 is moving toward the top of its stroke (FIG. 2), the piston 44' concurrently is moving in the opposite direction to the bottom of its stroke. When the piston 44 reaches its uppermost advance stroke and substantially the entire volume of air originally contained in the cylinder 10 has been moved through the molecular sieve bed 28, the sensor 72 signals the computer to again reverse fluid flow through the pump 60 and the piston 44 starts its downward retraction stroke. There is then created an immediate pressure drop in the cylinder 10 beneath the sieve bed, effectively drawing the oxygen rich air filling the space 30 between the outlet end 32 of the sieve bed and the check valve 18, back through the sieve bed and into the increasing space beneath sieve bed as the piston 44 retracts. As the oxygen enriched air passes back through the sieve bed it draws the previously stripped nitrogen off of the sieve bed and carries it out of the inlet 34 of the sieve bed and into the cylinder 10, effectively back-flushing the sieve bed of contaminants. This back-flushing is assisted by air being blown into the cylinder from the air inlet 36 fed continuously by blower fan 42. When the piston seal 46 passes below the air exhaust port 62 (FIG. 3) the air from the inlet 36 circulates through the cylinder 10 and out the exhaust port, carrying with it the back-flushed nitrogen, etc. freed from the sieve bed. The volume of fresh air flow through the cylinder is sufficient to completely change the air in the cylinder 10 before the start of a next cycle.

From the foregoing, it will be readily apparent that a substantially continuous flow of oxygen enriched air is provided to the accumulator vessel 22 by the alternately reciprocating pistons 44, 44' during operation of the apparatus. Moreover, it will also be seen that the molecular sieve beds 28, 28' of this apparatus are continuously and completely back-flushed during each repeating cycle in the operation of the apparatus. This assures the full effectiveness of the molecular sieve bed material at all times, irrespective of how long the apparatus has been running.

It is important to note that the apparatus of this invention works at a remarkably low speed, particularly when compared to the several hundred rpm speeds which most air compressors run at. By comparison, it has been determined that with cylinders 10, 10' having an internal diameter of approximately 6 inches and with pistons 44, 44' each arranged for an approximately 8 inch reciprocal stroke, the system described hereinbefore needs only to cycle at the rate of approximately one cycle per 15 seconds to continuously supply a necessary volume of oxygen enriched air at normal rates of use by a patient.

Given that the cycling from FIGS. 1 to 2 to 3 of the drawings is in the range of 15 seconds time, it will be apparent that there is substantially no friction heat created between the seal members 46, 46' and their respective cylinders 10, 10', and therefore wear between the rings and cylinders is substantially nil. It will also be readily apparent that in the slow operation of this apparatus there is no vibration, and the only sound consequent of the operation of the apparatus is a very faint whirr from the small electric blower fan 42 and the slight whine from the small electric fluid pressure pump motor 60. These levels of volume are substantially negligible and therefore virtually inaudible during operation of the apparatus.

Since the power requirements of these very small electric motors 42, 60 is very small, it is preferable that they be of low voltage DC type motors for their extremely low power consumption. Accordingly, the apparatus preferably includes a power converter (not shown) arranged to convert normal household AC voltage to the required DC voltage for operation of the various electrical components of the system. This provides apparatus that is extremely energy efficient and economical to operate for the patient at home. Also, this affords the possibility of providing the apparatus with a battery backup (not shown) for extended, portable operation of the apparatus when AC power is not available, such as during power failures or when the unit needs to be unplugged to be moved about. Further, this arrangement allows for the use of the apparatus in motor vehicles, using the motor vehicle electric system for power supply.

Figure 4:
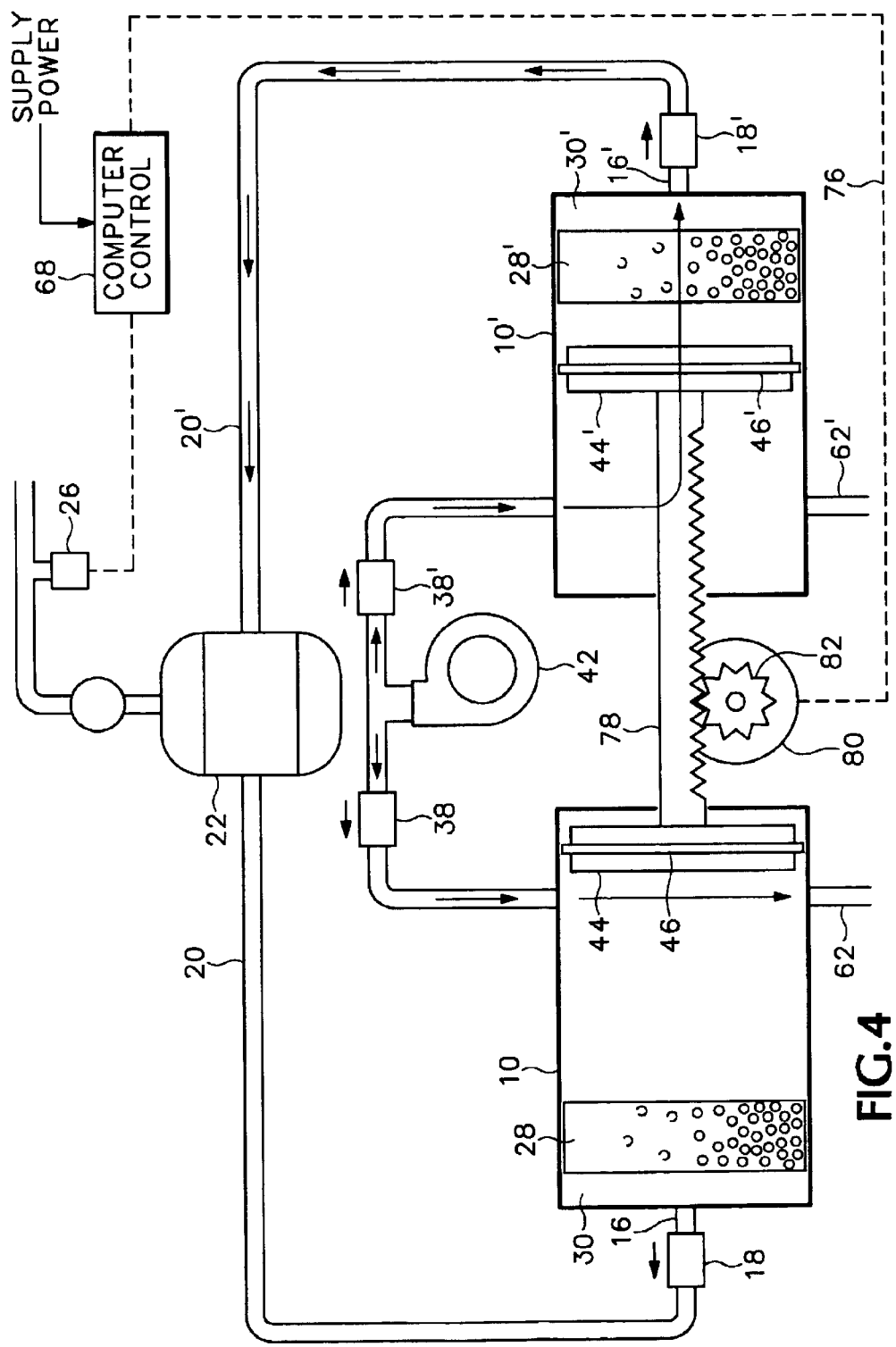
FIG. 4 is a schematic diagram of a second embodiment of the oxygen concentrator apparatus of this invention utilizing a rack and pinion drive arrangement in place of the fluid pressure drive arrangement in FIGS. 1–3.

Referring now to the embodiment illustrated in FIG. 4 of the drawings, the basic apparatus described hereinbefore is modified merely by replacing the fluid pressure piston drive means with an elongated rack member 78 supported for axial reciprocal movement between opposite linearly arranged cylinder members 10, 10'. The opposite ends of the rack member are connected to respective pistons 44, 44', and the reversible electric motor 80 mounts pinion gear 82 arranged for operative engagement with the rack 78. As will be apparent, operation of the motor 80 in forward and reverse directions effectively reciprocates the rack member 78 and the corresponding piston members 44, 44'. The remaining operation of the embodiment of FIG. 4 otherwise is identical to that previously described in connection with FIGS. 1–3.

Figure 5:
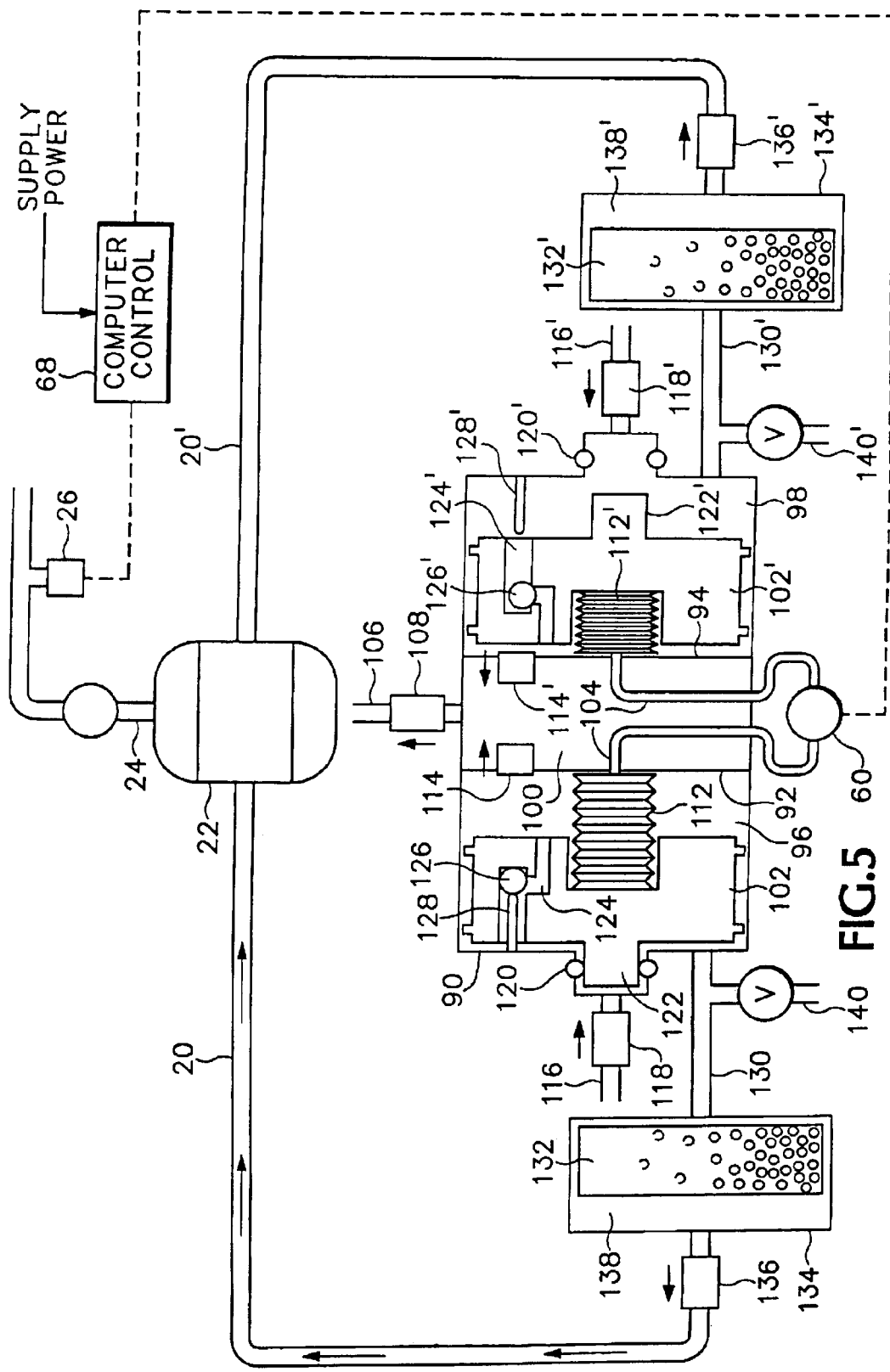
FIG. 5 is a schematic diagram of a third embodiment of the oxygen concentrator apparatus of this invention in which the pair of piston cylinder units of the previous embodiments are formed of a single cylindrical housing with a pair of pistons and the molecular sieve beds are contained in separate housings which communicate with each of the cylinders and the pistons are reciprocated by fluid pressure delivered to expandable bellows by a reversible fluid pressure pump controlled by a computer to effect expansion of one bellows and retraction of the other bellows for a cycle of operation of the apparatus.

Referring now to the embodiment of FIG. 5, a single cylinder 90 is divided by a pair of disc-like plates 92, 94 adjacent its center to form three axially aligned chambers 96, 98, 100, two of which 96, 98 house the pistons 102, 102'. The center chamber 100 forms an exhaust passageway and contains the fluid pressure tubing 104, and communicates with exhaust air outlet 106 through a one-way check valve 108 which allows air to exit but not enter the central passageway. The two plates 92, 94 anchor the bottom ends of opposite expandable bellows 112, 112' or air bags, the opposite ends of which are secured to the respective opposite pistons 102, 102'. The plates each include a one-way check valve 114, 114' arranged to allow air to flow from the outer, piston-containing chambers 96, 98 into the center passageway 100 and thence out the exhaust 106. The outermost, closed ends of the cylinder 90 are provided with air inlets 116, 116' through one-way check valves 118, 118' that allow room air to be drawn into the chambers 96, 98 on the retracting stroke of the pistons, but prevent escape of air out of the chambers during the advancing stroke of the pistons. O-ring seals 120, 120' match with projections 122, 122' on the pistons to prevent air movement when the pistons are fully advanced.

The pistons 102, 102' are each provided with a passageway 124, 124' through them, the passageways including normally closed spring-loaded ball valves 126, 126' arranged to prevent air passage through the pistons. The outer ends of the chambers 96, 98 include pin members 128, 128' which are arranged to project into the passageways in the pistons when the pistons are at the advanced end of its stroke, to engage and unseat the ball valves temporarily to open the passages through the pistons.

The outer ends of the cylinder chambers 96, 98 also include air passageways 130, 130' for the passage of air out of the chambers during the advance stroke of the pistons. The air is pushed through molecular sieve beds 132, 132' in separate housings 134, 134' the outer ends of which communicate through one-way check valves 136, 136' on the outlet end of the sieve beds to allow passage of oxygen enriched air from the spaces 138, 138' to the accumulator 22, but prevent any back-flow into the sieve bed.

At the end of the advance stroke of a piston, there will be surplus oxygen enriched air in the space 138, 138' between the sieve bed 132, 132' and the end of the chamber 134, 134' adjacent the check valves 136, 136'. This air is drawn back through the sieve bed on the retraction stroke of the piston, thereby back-flushing the molecular sieve bed material, as previously disclosed. FIG. 5 also shows a valve controlled air pressure outlet 140, 140' in the air passageways 130, 130' for convenient use of a source of nebulizer air pressure.

The operation of the embodiment of FIG. 5 is as follows: The fluid pressure pump 60 is operated under the control of computer 68 to expand one of the bellows (112 in FIG. 5), pushing the piston 102 outward in its advancing stroke. The fluid to expand the bellows 112 is drawn from the other bellows 112' which has been contracted with retraction of the piston 102'. As the piston 102 moves in its advance direction, air contained in the chamber 96 is pressed through the sieve bed 132. As the piston 102 approaches the end of its advance stroke, the pin 128 unseats the ball valve 126 to allow the compressed air remaining in the chamber 96 to pass through to the opposite side of the piston 102. The sudden drop in pressure in chamber 96 draws a surge of oxygen enriched air contained in the space 138 at the outer side of the sieve bed 132, thus back-flushing nitrogen laden air through the sieve bed and opening 124 through the piston and into the space in chamber 96 behind the piston 102. When the piston begins to make its retraction stroke, the pin 128 disengages from the ball valve 126, thereby closing the passageway 124 through the piston. Upon further retraction movement of the piston the nitrogen enriched air behind the piston is caused to flow through the check valve 114 into central passageway 100 and thence out of the system through the exhaust air outlet check valve 108.

During the retraction stroke of the piston 102 the pressure on the outer side of the piston is reduced, thereby drawing air into the chamber 96 through the air inlet 116. This air then ultimately is moved through the sieve bed 132 during the next advance stroke of the piston. Meanwhile, the opposite piston has been operating in precisely the reverse sequence.

From the foregoing, it will be apparent that each piston 102, 102' is used to push air slowly in both directions of its stroke, one direction to move air through the sieve bed and in the opposite direction to push back-flushing air out of the exhaust outlet. Also, it is to be noted that when the piston reaches its maximum advance stroke the space behind the piston is at a rather strong negative pressure because the check valves 114, 114' through the plates 92, 94 prevent air entry into the chambers 96, 98 behind the pistons. Thus, when the pistons are at their maximum advance stroke and the pins 128, 128' have unseated the ball check valve 126, 126' through the piston, the nitrogen rich air on the retracting side of the piston and in the sieve bed 132, 132' rushes through the passageways 124, 124' in the pistons to the area behind the piston which is at a greatly reduced pressure. The piston then operates to exhaust the nitrogen rich air through the exhaust outlet 106 during retraction movement of the piston.

Figure 6:
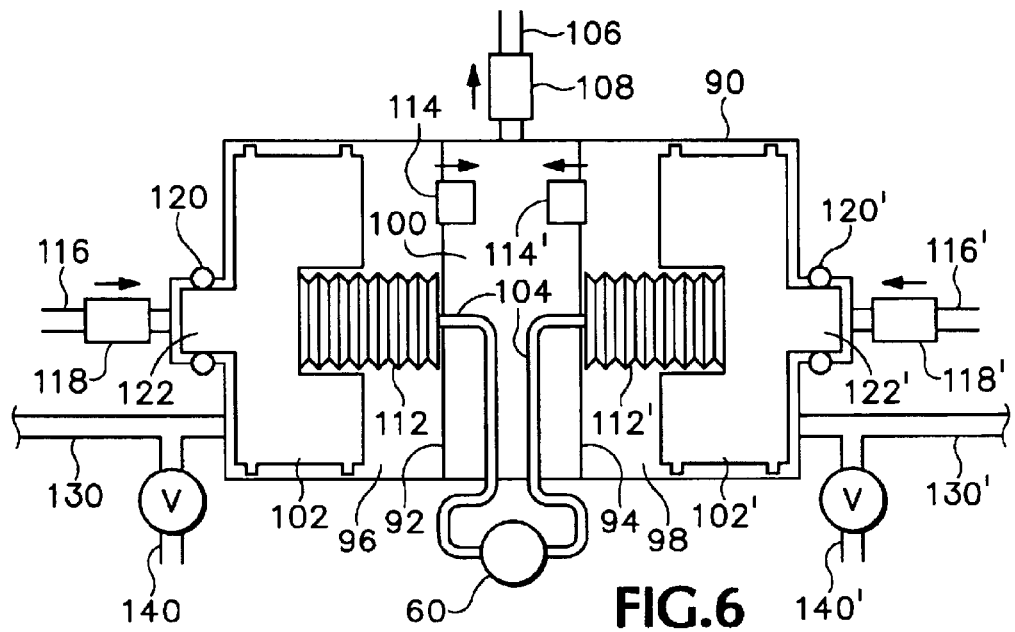
FIG. 6 is a fragmentary schematic diagram of the bellows drive of FIG. 5 modified by computer control to effect simultaneous expansion of both bellows to effect simultaneous advancement of both pistons.
Figure 7:
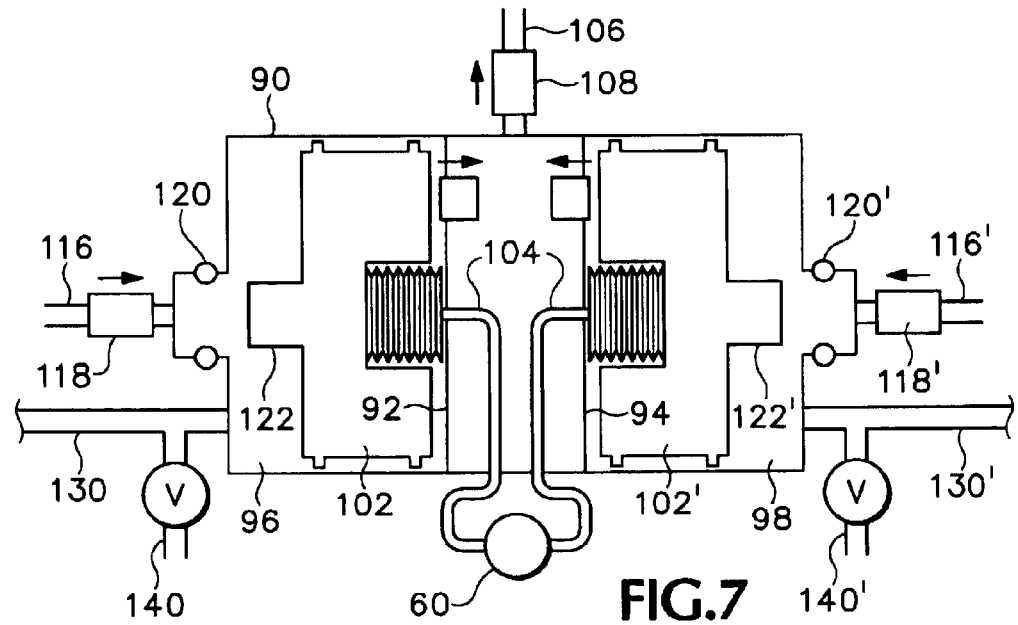
FIG. 7 is a fragmentary schematic diagram similar to FIG. 6 showing the reverse stage of operation of the reversible fluid pressure pump to effect simultaneous contraction of the bellows and retraction of both pistons, to complete a cycle of operation of the apparatus.

FIGS. 6 and 7 show the same structure as FIG. 5 but provide a cycling arrangement of the pistons in which the pump 60 is controlled by computer 68 to extend both bellows 112, 112' and pistons simultaneously (FIG. 6) and retract them simultaneously (FIG. 7) as distinguished from the alternating cycle of FIG. 5.

Figure 8:
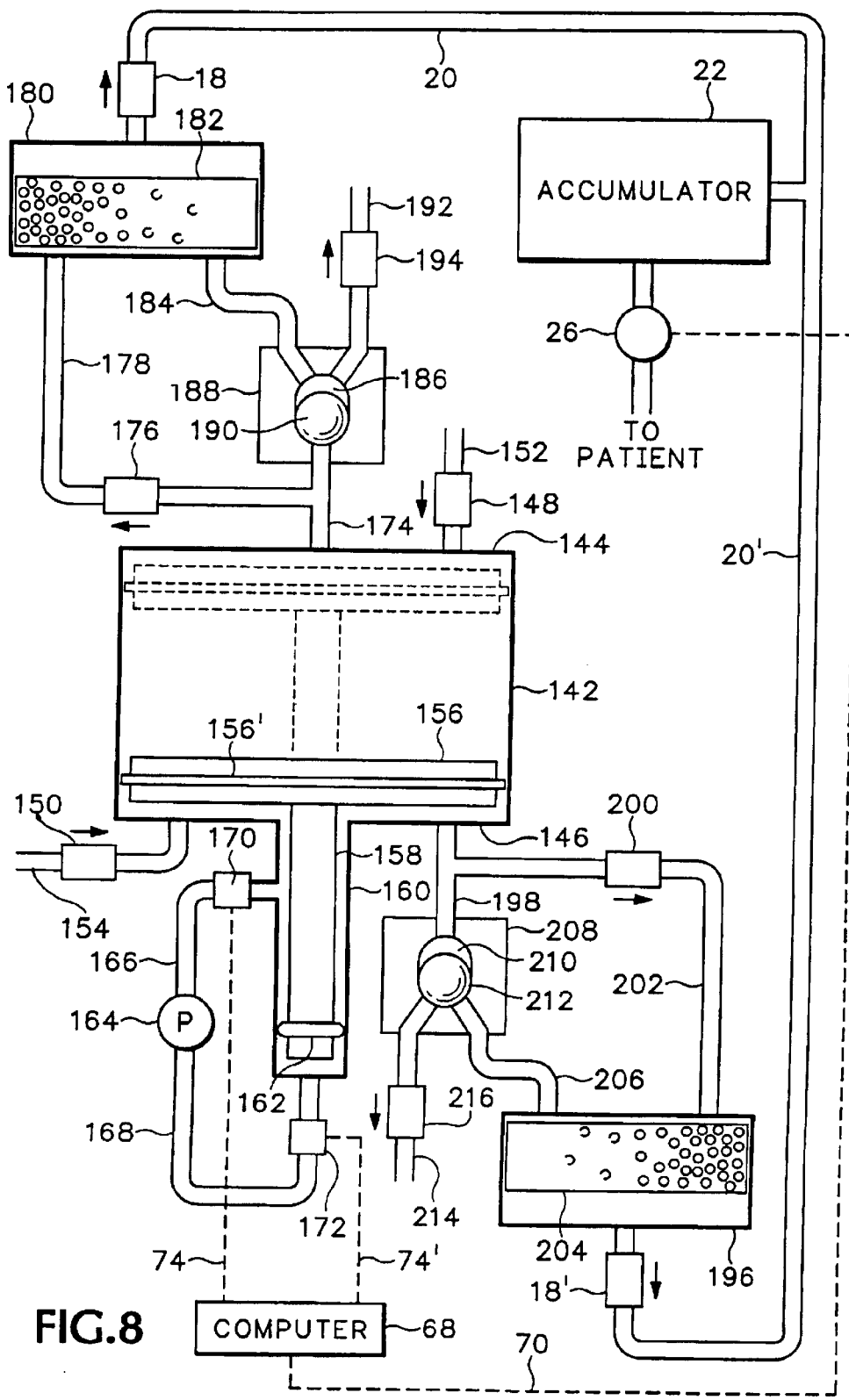
FIG. 8 is a schematic diagram of a fourth embodiment of the oxygen concentrator of this invention in which the pairs of piston-cylinder units of the previous embodiments are replaced with a single, double acting piston-cylinder unit.

FIG. 8 illustrates a still further embodiment of this invention wherein a single piston-cylinder unit is configured to perform the operations of the two piston-cylinder units of the previously described embodiments. Thus, an elongated cylinder 142 is closed at both ends by end walls 144 and 146. One way check valves 148 and 150 in air inlet tubes 152 and 154 extend through the end walls 144 and 146, respectively, allowing atmospheric or room air to be drawn into the cylinder 142 but prevent the reverse passage of air out of the cylinder.

A piston 156 in the cylinder is connected to an elongated piston rod 158 which extends outwardly through end wall 146 and into elongated drive cylinder 160. A drive piston 162 on the end of piston rod 158 opposite piston 156 functions by fluid pressure to reciprocate the piston 162 in a drive cylinder 160 and consequently the piston 156 in main cylinder 142. Fluid pressure, either pneumatic or hydraulic, is delivered to drive cylinder 160 by a reversible pump 164. Conduits 166 and 168 communicate the pump outlet selectively to opposite ends of the drive cylinder 160. Reversal of the pump and limit sensors 170 and 172 are controlled by computer 68, in the manner of the embodiment of FIGS. 1–3. Piston seal rings 156' effectively seal against the wall of the cylinder 142 in both directions of movement of the piston.

The cylinder 142 communicates at one end through conduit 174 in end wall 144 and through check valve 176 and conduit 178, with the inlet end of chamber 180 in which molecular sieve bed 182 is contained. A second conduit 184 communicates the same end 144 of cylinder 142 with the same inlet end of chamber 180 as conduit 178, through conduit 174 and the cavity 186 in housing 188 for ball valve 190. The cavity also communicates conduit 184 with the exhaust conduit 192 for exhausting backflushed nitrogen rich air from the chamber 180 to atmosphere. Check valve 194 in conduit 192 prevents entry of atmospheric air into cavity 186.

In similar manner, the cylinder 142 communicates at the opposite end 146 with the inlet end of chamber 196 through conduit 198, check valve 200 and conduit 202. Molecular sieve bed 204 is contained in chamber 196. A second conduit 206 communicates the same end 146 of cylinder 142 with the same inlet end of chamber 196 as conduit 202 through the housing 208 of the cavity 210 for ball valve 212. The ball valve cavity also communicates conduit 206 with exhaust outlet conduit 214 through check valve 216.

The operation of the oxygen concentrator of FIG. 8 is as follows: In the illustrated closed position of the ball valve 190, resulting from retracting movement of piston 156 away from wall 144, the conduit 184 communicates the housing 180 with exhaust outlet 192 and blocks exhaust air from returning to cylinder 142. Nitrogen rich air in the housing 180 thus is exhausted through outlet 192 to the atmosphere, and fresh air is drawn into the cylinder 142 through air inlet 152.

In the open position of the ball valve 190 during the extended movement of piston 156 in cylinder 142 toward end wall 144, the conduits 184 and 192 are closed against movement of air from cylinder 142 to atmospheric exhaust, and conduit 178 is opened to allow movement of air from cylinder 142 through check valve 176 and into housing 180.

Concomitently, movement of the piston 156 toward wall 146 moves the ball valve 212 to close the conduits 206 and 214. Air in the piston rod end of cylinder 142 is moved through conduit 202 into housing 196 where nitrogen is stripped from the air as it passes through the molecular sieve bed 204. The oxygen enriched air is moved through conduit 20' to accumulator 22 for use by a patient.

When the piston 156 reaches its limit of movement toward wall 146, fluid pressure sensors 170 and 172 signal the computer 68 which thereupon reverses the operation of the drive motor of pump 164. Fluid pressure thus is delivered to the bottom end of drive piston 162, moving it and piston rod 158 upward in drive cylinder 160. Piston 156 thereupon is moved upward in cylinder 142, away from end wall 146 and toward end wall 144. This movement of piston 156 effects movement of ball valve 212 to communicate conduit 206 with exhaust conduit 214, to backflush the molecular sieve 204 and exhaust resulting nitrogen enriched air to the atmosphere.

At the same time, movement of piston 156 toward the upper wall 144 moves the ball valve 190 upward to close the conduits 184 and 192. Air in cylinder 142 thus is moved through check valve 176 and conduit 178 into the inlet end of the housing 180. Nitrogen is stripped from the air and oxygen enriched air is moved through check valve 18 and conduit 20 to accumulator 22 where it is available for use by a patient.

It will be apparent to those skilled in the art that various changes and modifications may be made in the size, shape, type, number and arrangement of parts and in the structural configurations described hereinbefore. For example, although the embodiment of FIG. 8 is shown disposed in a vertical orientation, it may be disposed horizontally, if desired. Other forms of conventional valves may replace the ball valves of FIG. 8. These and many other modifications may be made without departing from the spirit of this invention and the scope of the appended claims:

I claim:
1. An oxygen concentrator, comprising:
a) first and second chambers,
b) stationary molecular sieve members communicating one with each of said chambers for stripping nitrogen from air, each sieve member having an air inlet side and an oxygen enriched air outlet side for providing an oxygen enriched air output,
c) air inlets communicating one with each of said chambers on said air inlet side of the corresponding molecular sieve member,
d) oxygen enriched air outlets communicating one with each of said chambers adjacent said outlet side of the corresponding molecular sieve member,
e) a fixed volume space between said outlet side of each sieve member and the corresponding oxygen enriched air outlet for storing a portion of the oxygen enriched air issued from the outlet side of said sieve member for back-flushing oxygen enriched air back through the sieve member to remove nitrogen therefrom,
f) outlet passageway means communicating with each of said oxygen enriched air outlets for delivering oxygen enriched air,
g) one-way valve means in each of said outlet passageway means for preventing return of oxygen enriched air to each of said fixed spaces,
h) piston means reciprocative in each of said first and second chambers for moving air through the corresponding molecular sieve members selectively in a nitrogen stripping direction and a reverse back-flushing direction, and
i) exhaust outlets communicating one with each of said chambers on said air inlet side of the corresponding molecular sieve member for exhausting nitrogen rich air from said chambers.

2. The oxygen concentrator of claim 1 wherein said first and second chambers are in a single cylinder, and said piston means is a single reciprocating piston separating said first and second chambers.

3. The oxygen concentrator of claim 2 including drive means engaging said piston for reciprocating said piston in said chamber for moving air through said molecular sieve members selectively in a nitrogen stripping direction and in a reverse back-flushing direction.

4. The oxygen concentrator of claim 1 including drive means operatively engaging said piston means for reciprocating said piston means.

5. The oxygen concentrator of claim 4 wherein the drive means comprises rack means interengaging said piston means, pinion means coupled to said rack means, and reversible rotary power means engaging said pinion means for reciprocating said rack means and piston means.

6. The oxygen concentrator of claim 5 wherein the first and second chambers are disposed in axial alignment with said rack means.

7. The oxygen concentrator of claim 4 wherein the drive means comprises a fluid pressure cylinder associated with each of said chambers, a piston rod reciprocative in each cylinder and connected to the associated piston means, and reversible fluid pressure pump means communicating with said cylinders for reciprocating said piston rods and connected piston means.

8. The oxygen concentrator of claim 4 wherein the drive means includes fluid pressure pump means, and computer control means associated with the fluid pump means for controlling the reciprocation of said pump means.

9. The oxygen concentrator of claim 4 wherein the molecular sieve member is contained in each chamber between the oxygen enriched air outlet and piston means.

10. The oxygen concentrator of claim 4 including a housing for each molecular sieve member communicating adjacent one end with the corresponding chamber and adjacent the opposite end with the oxygen enriched air outlet of the corresponding chamber.

11. The oxygen concentrator of claim 10 including an auxiliary exhaust air outlet between the housings and chambers.

12. The oxygen concentrator of claim 4 wherein the first and second chambers are formed separately and disposed in axially parallel arrangement, and the air inlets of said chambers communicate with an air delivery fan.

13. The oxygen concentrator of claim 4 wherein the drive means comprises an expandable bellows member interengaging said piston means and corresponding chamber, and reversible fluid pressure pump means communicating with said bellows member for expanding and contracting said bellows member.

14. The oxygen concentrator of claim 13 wherein the fluid pressure pump means is operable to reciprocate said piston means sequentially in extending and retracting directions.

15. The oxygen concentrator of claim 13 wherein the fluid pressure pump means is operable to reciprocate said piston means simultaneously in alternate extending and retracting directions.

16. The oxygen concentrator of claim 4 wherein the first and second chambers are formed within a single cylinder and separated by a central passageway communicating with said exhaust outlet.

17. The oxygen concentrator of claim 16 including passageway means through each of said piston means, check valve means in each said passageway, and check valve operator means in said chambers arranged to open said check valve means at the advance position of the corresponding piston means.

18. The oxygen concentrator of claim 4 wherein said drive means includes power means including computer control means for effecting selective movements of said piston.

19. An oxygen concentrator, comprising:
a) first and second separate chambers disposed in axially parallel arrangement,
b) stationary molecular sieve members communicating one with each of said chambers for stripping nitrogen from air, each sieve member having an air inlet side and an oxygen enriched air outlet side for providing an oxygen enriched air output,
c) air inlets communicating one with each of said chambers on said air inlet side of the corresponding molecular sieve member,
d) oxygen enriched air outlets communicating one with each of said chambers adjacent said outlet side of the corresponding molecular sieve member,
e) a fixed volume space between said outlet side of each sieve member and the corresponding oxygen enriched air outlet for storing a portion of the oxygen enriched air issued from the outlet side of said sieve member for back-flushing oxygen enriched air back through the sieve member to remove nitrogen therefrom,
f) outlet passageway means communicating with each of said oxygen enriched air outlets for delivering oxygen enriched air,
g) one-way valve means in each of said outlet passageway means for preventing return of oxygen enriched air to each of said fixed spaces,
h) piston means reciprocative in each of said first and second chambers for moving air through said molecular sieve member selectively in a nitrogen stripping direction and in a reverse back-flushing direction,
i) piston drive means comprising fluid pressure cylinders associated one with each of said chambers, a piston rod reciprocative in each cylinder and connected to the corresponding piston means, and reversible fluid pressure pump means communicating with said cylinders for reciprocating said piston rods and connected piston means, and
j) exhaust outlets communicating one with each of said chambers on said air inlet side of said molecular sieve member for exhausting nitrogen rich air from said chambers.

20. An oxygen concentrator, comprising:
a) first and second chambers disposed in axial alignment,
b) stationary molecular sieve members communicating one with each of said chambers for stripping nitrogen from air, each sieve member having an air inlet side and an oxygen enriched air outlet side,
c) air inlets communicating one with each of said chambers on said air inlet side of the corresponding molecular sieve member,
d) oxygen enriched air outlets communicating one with each of said chambers adjacent said outlet side of the corresponding molecular sieve member,
e) a fixed volume space between said outlet side of each sieve member and said oxygen enriched air outlet for storing a portion of the oxygen enriched air adjacent the outlet side of said sieve member for back-flushing through the sieve member to remove nitrogen therefrom,
f) outlet passageway means communicating with said oxygen enriched air outlets for delivering oxygen enriched air,
g) one-way valve means in each of said outlet passageway means for preventing return of oxygen enriched air to said fixed spaces,
h) piston means reciprocative in each of said first and second chambers for moving air through said molecular sieve member selectively in a nitrogen stripping direction and in a reverse back-flushing direction,
i) drive means comprising a rack member interengaging said piston means, a pinion member coupled to said rack member, and reversible notary power means engaging said pinion member for reciprocating said rack member and piston means, and
j) exhaust outlets communicating one with each of said chambers on said air inlet side of said molecular sieve member for exhausting nitrogen rich air from said chambers.

21. An oxygen concentrator, comprising:
a) first and second chambers formed within a single cylinder and separated by a central exhaust passageway,
b) stationary molecular sieve members communicating one with each of said chambers for stripping nitrogen from air, each sieve member having an air inlet side and an oxygen enriched air outlet side,
c) a housing for each molecular sieve member communicating at one end with the corresponding first and second chambers,
d) air inlets communicating one with each of said first and second chambers on said air inlet side of the corresponding molecular sieve member, e) oxygen enriched air outlets communicating one with each of said housings adjacent said outlet side of the corresponding molecular sieve member, f) a fixed volume space between said outlet side of each sieve member and the corresponding oxygen enriched air outlet for storing a portion of the oxygen enriched air issued from the outlet side of said sieve member for back-flushing oxygen enriched air back through the sieve member to remove nitrogen therefrom, g) outlet passageway means communicating with each of said oxygen enriched air outlets for delivering oxygen enriched air, h) one way valve means in each of said outlet passageway means for preventing return of oxygen enriched air to each of said fixed spaces, i) piston means reciprocative in each of said first and second chambers for moving air through said molecular sieve member selectively in a nitrogen stripping direction and in a reverse back-flushing direction, j) drive means operatively engaging each piston means for reciprocating said piston means, the drive means comprising an expandable bellows member interengaging each piston means and corresponding chamber, and reversible fluid pressure pump means communicating with said bellows member for expanding and contracting said bellows members for expanding and contracting said bellows members to reciprocate the corresponding piston means, and k) an exhaust outlet communicating with said central exhaust passageway for exhausting nitrogen rich air from said chambers.

22. The oxygen concentrator of claim 21 wherein the fluid pressure pump means is operable to reciprocate said first and second piston means sequentially in extending and retracting directions.

23. The oxygen concentrator of claim 21 wherein the fluid pressure pump means is operable to reciprocate said first and second piston means simultaneously in alternate extending and retracting directions.

24. The oxygen concentrator of claim 21 including passageway means through each of said piston means, check valve means in each said passageway, and check valve operator means in said chamber an to open said check valve means at the nitrogen stripping position of the associated piston means.

25. An oxygen concentrator, comprising:

a) a single air cylinder having a pair of air inlets communicating one with each end of the cylinder and a pair of nitrogen rich air outlets communicating one with each end of the cylinder, b) a single reciprocative piston in said cylinder forming first and second piston chambers on opposite sides of said piston, c) housing means forming a pair of sieve chambers one for each sieve member, a first sieve chamber having an air inlet at one end and an oxygen enriched air outlet at the opposite end, the second sieve chamber having an air inlet at one end and an oxygen enriched air outlet at the opposite end, d) stationary molecular sieve members contained one within each of said sieve chambers for stripping oxygen from air, each sieve member having an air inlet side and an oxygen enriched air outlet side for providing an oxygen enriched air output, e) air inlets communicating one with each of said housings on said air inlet side of the corresponding molecular sieve member, f) oxygen enriched air outlets communicating one with each of said housings adjacent said outlet side of the corresponding molecular sieve member, g) a fixed volume space between said outlet side of each sieve member and said oxygen enriched air outlet for storing a portion of the oxygen enriched air adjacent the outlet side of said sieve member for back-flushing through the sieve member to remove nitrogen therefrom, h) outlet passageway means communicating with said oxygen enriched air outlets for delivering oxygen enriched air, i) one-way valve means in each of said outlet passageway means for preventing return of oxygen enriched air to said fixed spaces, j) piston means reciprocative in said cylinder for moving air through said molecular sieve members selectively in a nitrogen stripping direction and in a reverse back-flushing direction, and k) exhaust outlets communicating one with each of said sieve chambers on said inlet side of the corresponding molecular sieve members for exhausting nitrogen rich air from said sieve chambers.

26. The oxygen concentrator of claim 25 wherein the drive means comprises a fluid pressure drive cylinder associated with said air cylinder, a piston rod reciprocative in said drive cylinder and connected to said piston means, and reversible fluid pressure pump means communicating with said drive cylinder for reciprocating said piston rod and piston means.

* * * * *